United States Patent
Gennasio et al.

(10) Patent No.: US 9,879,811 B2
(45) Date of Patent: Jan. 30, 2018

(54) QUICK-FIT HYDRAULIC OR HYDRODYNAMIC COUPLING FOR PRESSURIZED FLUIDS

(71) Applicant: ALFA GOMMA S.p.A., Vimercate (Monza Brianza) (IT)

(72) Inventors: Enrico Gennasio, Vimercate (IT); Stefano Mazzoli, Mezzago (IT); Rinaldo Doi, Merlino (IT)

(73) Assignee: ALFA GOMMA S.P.A., Vimercate (Monza Brianza) (IT)

( * ) Notice: Subject to any disclaimer, the term of this patent is extended or adjusted under 35 U.S.C. 154(b) by 1 day.

(21) Appl. No.: 14/782,136

(22) PCT Filed: Dec. 17, 2013

(86) PCT No.: PCT/EP2013/076849
§ 371 (c)(1),
(2) Date: Oct. 2, 2015

(87) PCT Pub. No.: WO2014/161616
PCT Pub. Date: Oct. 9, 2014

(65) Prior Publication Data
US 2016/0061370 A1    Mar. 3, 2016

(30) Foreign Application Priority Data
Apr. 5, 2013  (IT) .............. MI2013A0522

(51) Int. Cl.
*F16L 37/34*  (2006.01)
*F16L 37/56*  (2006.01)
(Continued)

(52) U.S. Cl.
CPC .............. *F16L 37/34* (2013.01); *F16K 31/12* (2013.01); *F16L 19/0206* (2013.01);
(Continued)

(58) Field of Classification Search
CPC . F16L 37/30; F16L 37/32; F16L 37/34; F16L 37/35; F16L 21/08; F16L 19/0206; F16L 29/007; F16L 37/56; F16K 31/12
(Continued)

(56) References Cited

U.S. PATENT DOCUMENTS 2,511,765 A * 6/1950 Bradbury .............. F16L 37/088
                                                  137/614.03
3,809,122 A * 5/1974 Berg ..................... F16L 27/093
                                                  137/614.06
(Continued)

FOREIGN PATENT DOCUMENTS

DE    202006003300 U1   7/2007
FR         2122880 A5   9/1972
(Continued)

OTHER PUBLICATIONS

International Search Report dated Apr. 11, 2014 which issued during prosecution of International Patent Application No. PCT/EP2013/076849.

*Primary Examiner* — Ian Paquette
(74) *Attorney, Agent, or Firm* — Troutman Sanders LLP

(57) ABSTRACT

The quick-fit coupling (1) for pressurized fluid comprises a valve body (3) extending along a longitudinal axis (L) and having an axial cavity (4) wherein a shutter stem (5) is axially movable with respect to the valve body in contrast to and by action of at least one elastic element (6) between a position for opening and a position for closing an axial passage of fluid through said cavity (4), the stem (5) being configured so as to be subjected by the fluid present in the cavity (4) to a resultant force having a substantially null component at least in an axial direction.

14 Claims, 8 Drawing Sheets

(51) Int. Cl.
*F16K 31/12* (2006.01)
*F16L 19/02* (2006.01)
*F16L 21/08* (2006.01)
*F16L 29/00* (2006.01)

(52) U.S. Cl.
CPC ............. *F16L 21/08* (2013.01); *F16L 29/007* (2013.01); *F16L 37/56* (2013.01)

(58) Field of Classification Search
USPC .................... 137/614.02–614.06; 285/316
See application file for complete search history.

(56) References Cited

U.S. PATENT DOCUMENTS

| | | | | |
|---|---|---|---|---|
| 4,269,389 A | * | 5/1981 | Ekman | F16L 37/23 137/614.03 |
| 4,596,272 A | * | 6/1986 | Medvick | F16L 37/133 137/614.03 |
| 5,179,976 A | * | 1/1993 | Boland | F16L 37/23 137/614.04 |
| 6,095,190 A | * | 8/2000 | Wilcox | F16L 37/23 137/614 |
| 6,161,578 A | * | 12/2000 | Braun | F16L 37/0841 137/614.03 |
| 7,147,003 B2 | * | 12/2006 | Maldavs | F16L 37/34 137/614.03 |
| 2005/0056325 A1 | * | 3/2005 | Becocci | B60T 17/043 137/614.04 |
| 2011/0272937 A1 | * | 11/2011 | Bohman | F16L 37/20 285/81 |

FOREIGN PATENT DOCUMENTS

GB 2310472 A 8/1997
WO 2012/173152 A1 12/2012

* cited by examiner

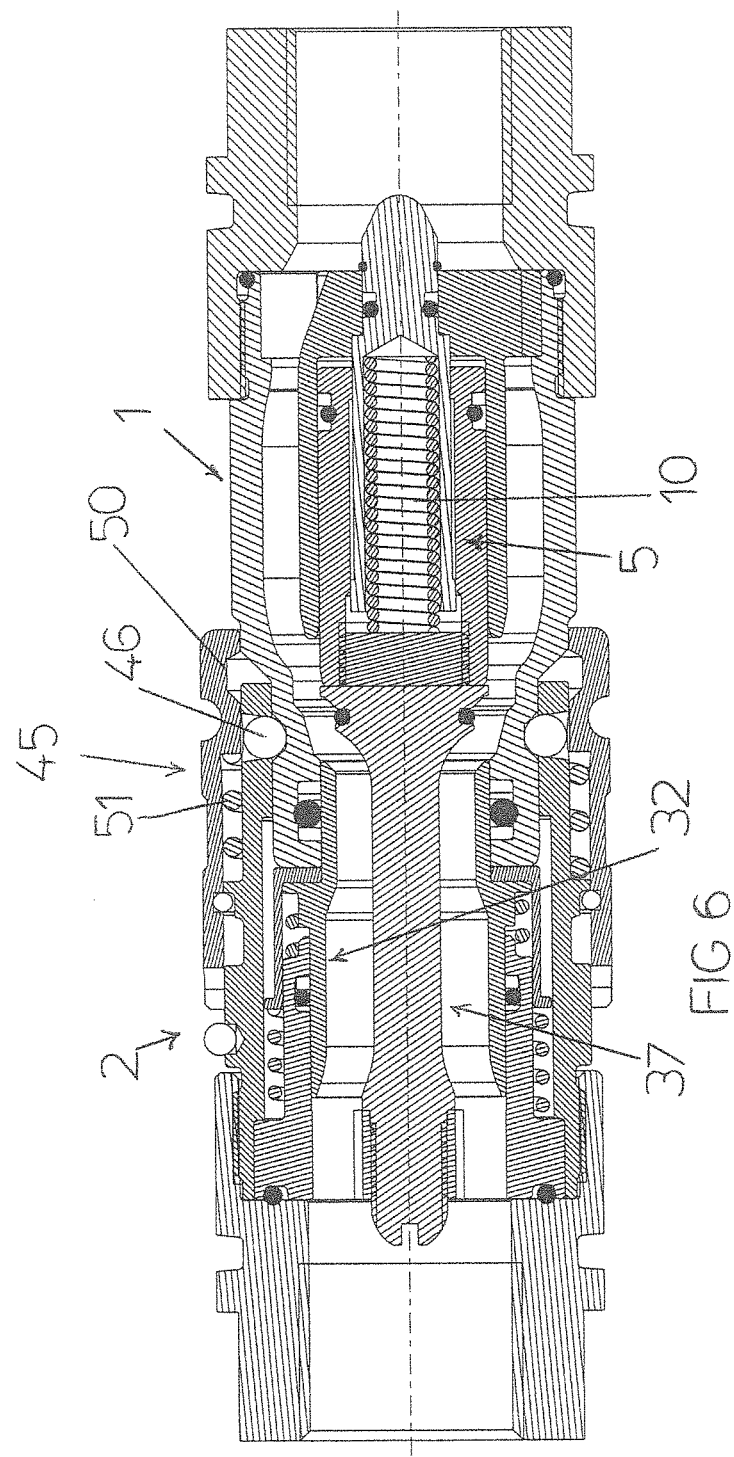

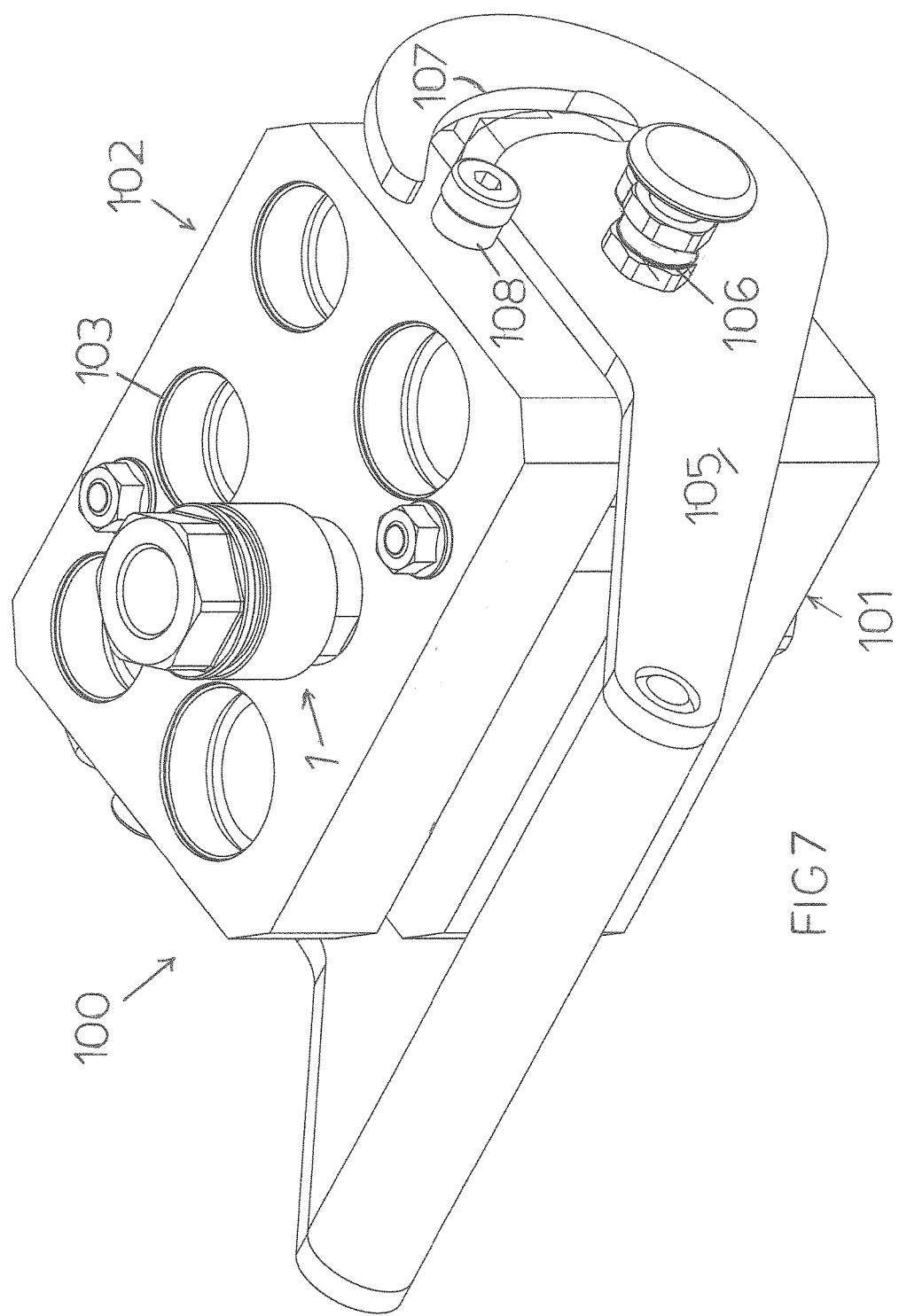

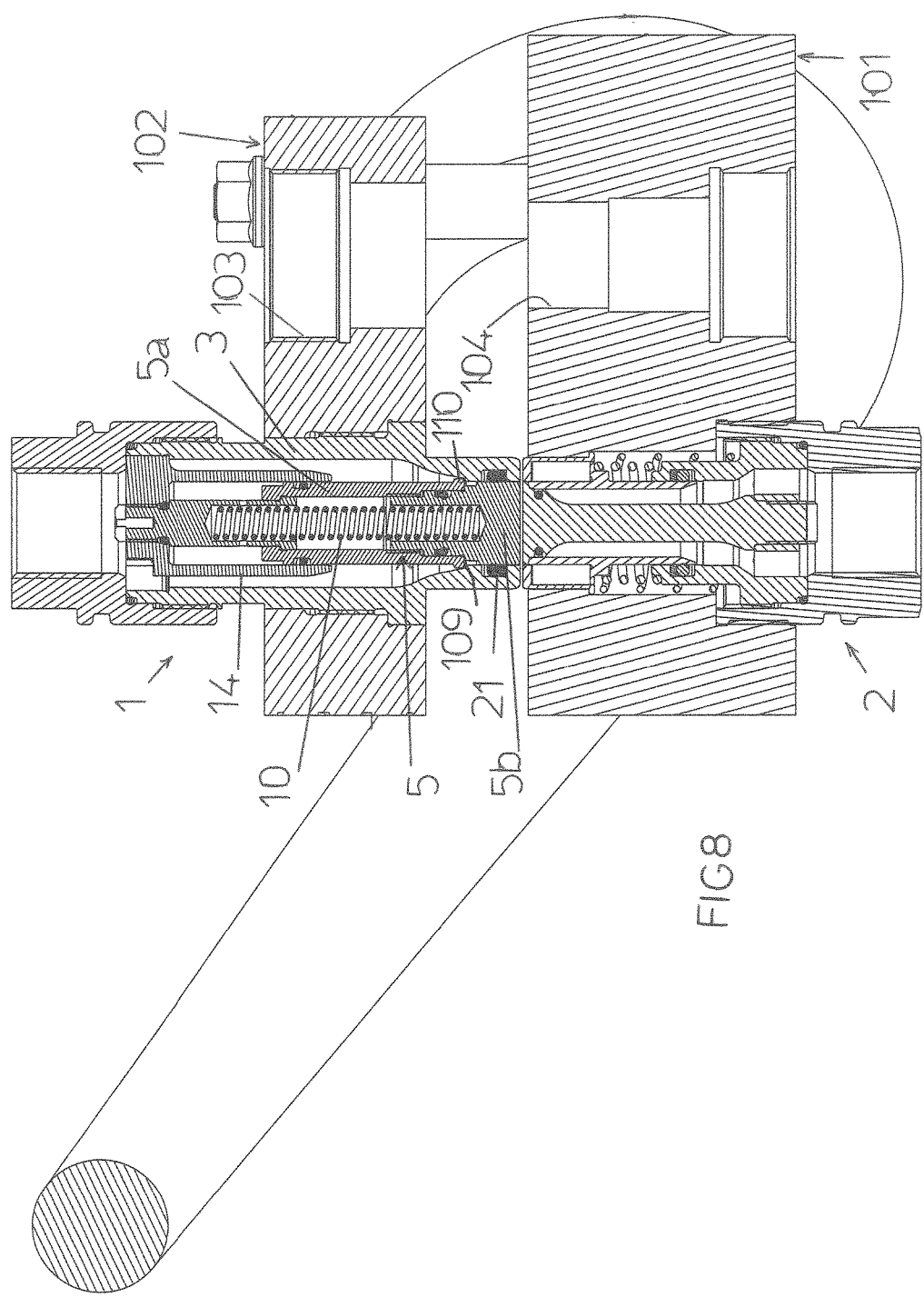

QUICK-FIT HYDRAULIC OR HYDRODYNAMIC COUPLING FOR PRESSURIZED FLUIDS

CROSS-REFERENCE TO RELATED APPLICATIONS

This application is the U.S. National Phase of International Patent Application Serial No. PCT/EP2013/076849, filed on Dec. 17, 2013, which claims priority to Italian Patent Application No. MI2013A000522, filed on Apr. 5, 2013, both of which are herein incorporated by reference in their entireties.

The present invention refers to a quick-fit hydraulic or hydrodynamic coupling for pressurised fluids, which can be used in agricultural and industrial applications. More specifically, it refers to a quick-fit coupling comprising a valve body having an axial cavity in which a shutter stem is elastically stressed so as to carry out a relative movement with respect to the valve body, between a position for opening and a position for closing an axial passage of fluid through the cavity.

The quick-fit coupling can be of a male type, or a female type, respectively, and it is engageable with a female coupling, or a male coupling, respectively, and the reciprocal locking thereof is generally achieved by means of a ring nut borne by the female coupling.

In the disconnected state, the coupling normally has the shutter in the position for closing the passage, which opens only by effect of the engagement of the couplings to each other.

Couplings of this sort are designed to prevent partial closure of the shutter with reversal of flow and the occurrence of peaks in the flow.

To carry out the engagement of the male coupling and the female coupling safely, the female coupling generally releases the pressure of the fluid as a preliminary step, by means of controlled opening of the shutter.

However, this procedure is not entirely free of risk as concerns the safety of the operator and it brings about a waste of fluid, which, furthermore, must be recovered and disposed of.

This procedure also entails the risk of air becoming trapped in the fluid. Therefore, the technical task proposed by the present invention is to realise a quick-fit hydraulic or hydrodynamic coupling for pressurised fluids that makes it possible to eliminate the technical drawbacks of the prior art as described hereinabove.

Within the scope of this technical task, one aim of the invention is to realise a quick-fit hydraulic or hydrodynamic coupling for pressurised fluids that enables the safe engagement thereof without loss of fluid and without the risk of contamination of the fluid with air.

A further aim of the invention is to realise a quick-fit hydraulic or hydrodynamic coupling for pressurised fluids that optimises the maximum flow rate achievable, while ensuring a high standard of safety for the operator during use, combined with adequate operating reliability.

The technical task, as well as the stated and other aims, according to the present invention, are achieved by realising a quick-fit coupling for pressurised fluid, comprising a valve body extending along a longitudinal axis and having an axial cavity in which a shutter stem is axially movable with respect to the valve body in contrast to and by action of at least one elastic element between a position for opening and a position for closing an axial passage of fluid through said cavity, characterised in that said stem is configured so as to be subjected by the fluid present in said cavity to a resultant force having a substantially null component at least in an axial direction.

Owing to the characteristic configuration of the stem, engagement of the coupling can be carried out manually, without releasing the pressure of the fluid, given that the pressure of the fluid does not oppose the relative axial sliding of the stem with respect to the valve body, which determines the opening of the passage.

As a result, the conventional problems related to fluid being released to carry out the engagement are eliminated.

The special configuration of the shutter stem and the valve body also enables optimisation of the flow, minimising head losses affecting the fluid upon passage through the coupling.

The coupling thus configured is preferably a male type of coupling, but in some embodiments it may also be a female type of coupling.

The invention also discloses the use of these couplings in a multi-connection plate having two opposite plate elements mutually constrained in translation, one with respect to the other, a first plate element supporting a plurality of these male couplings, a second plate element supporting a plurality of female couplings, each one being engageable by a corresponding male coupling, there being further provided a lever for the reciprocal movement and locking of the plate elements in a position of engagement of the male couplings in the corresponding female couplings.

Moreover, further characteristics of the present invention are defined in the claims herein below.

Further characteristics and advantages of the invention will emerge more clearly from the description of a preferred, but not exclusive, embodiment of the quick-fit coupling according to the invention, which is illustrated by way of approximate, non-limiting example in the accompanying drawings, in which:

FIGS. 5 and 6 show an axial section of the quick-fit male coupling and a variant for the quick-fit female coupling, respectively, in the decoupled state and in the state of complete engagement, respectively.

FIG. 7 is a perspective view of a multi-connection plate suitable for supporting a plurality of couplings according to the invention.

FIG. 8 is a section of the plate appearing in FIG. 7, showing the male coupling and the corresponding female coupling prior to the mutual connection thereof.

Figure 1:
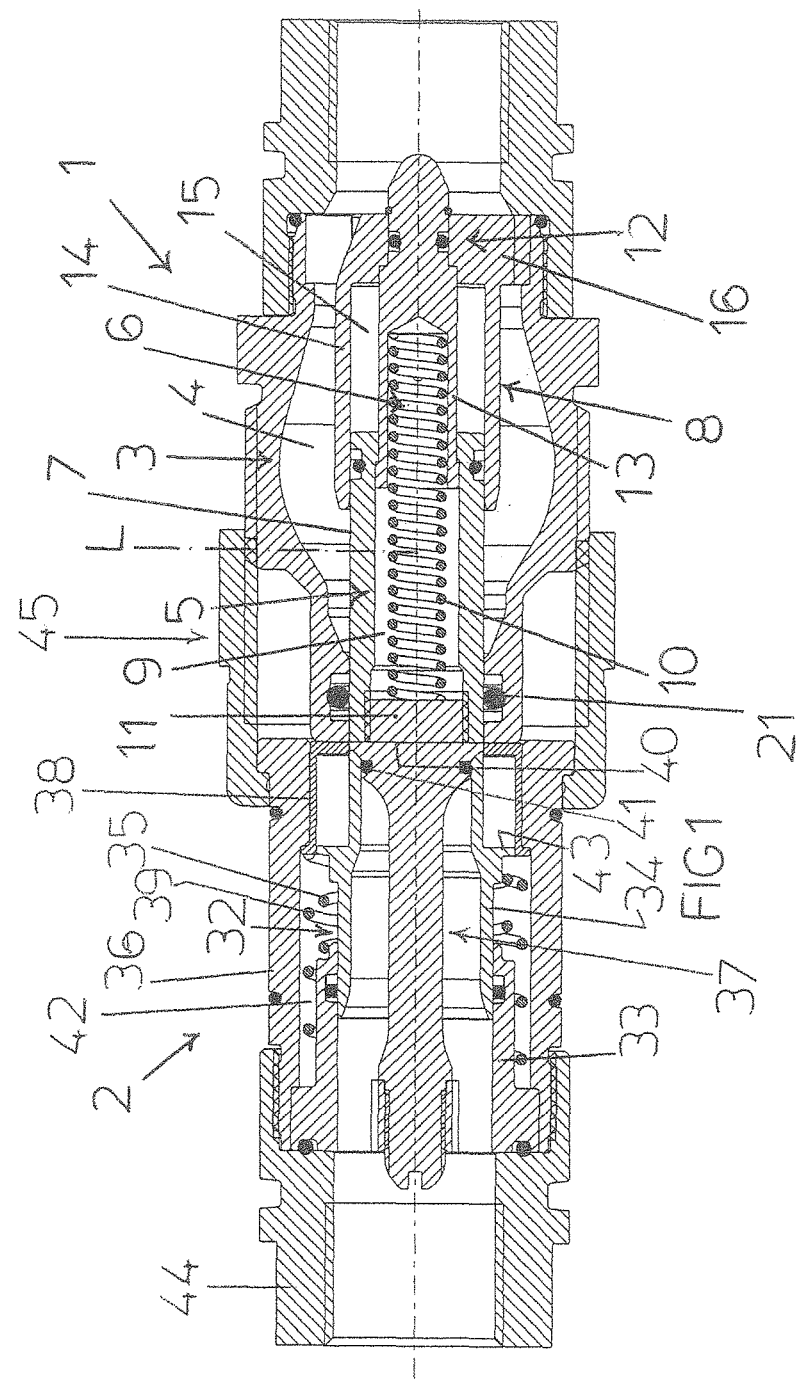
FIGS. 1 to 4 show an axial section of the quick-fit male coupling and the quick-fit female coupling, in the configurations gradually taken on from the decoupled state to the state of complete engagement.
Figure 2:
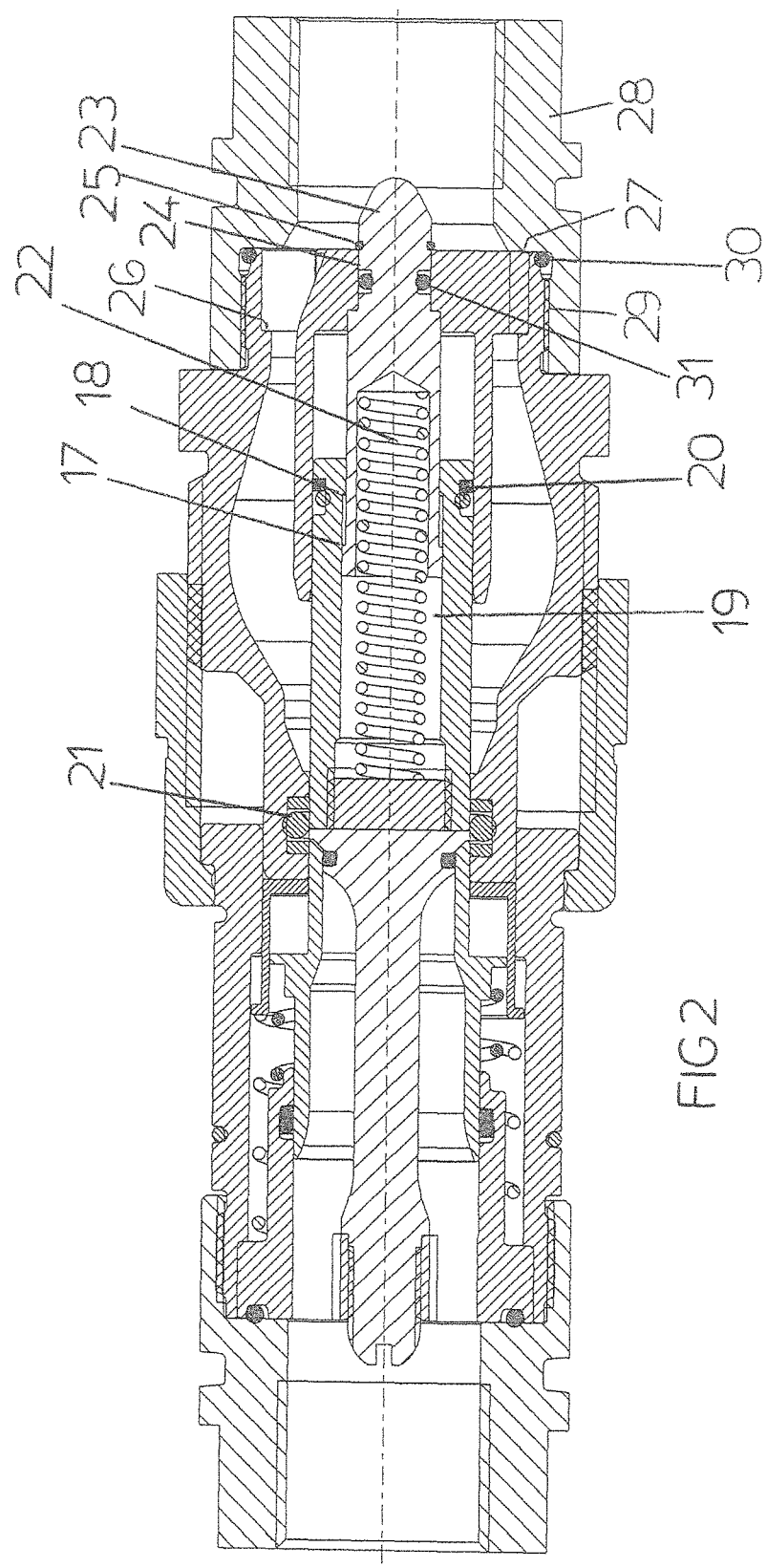
Figure 3:
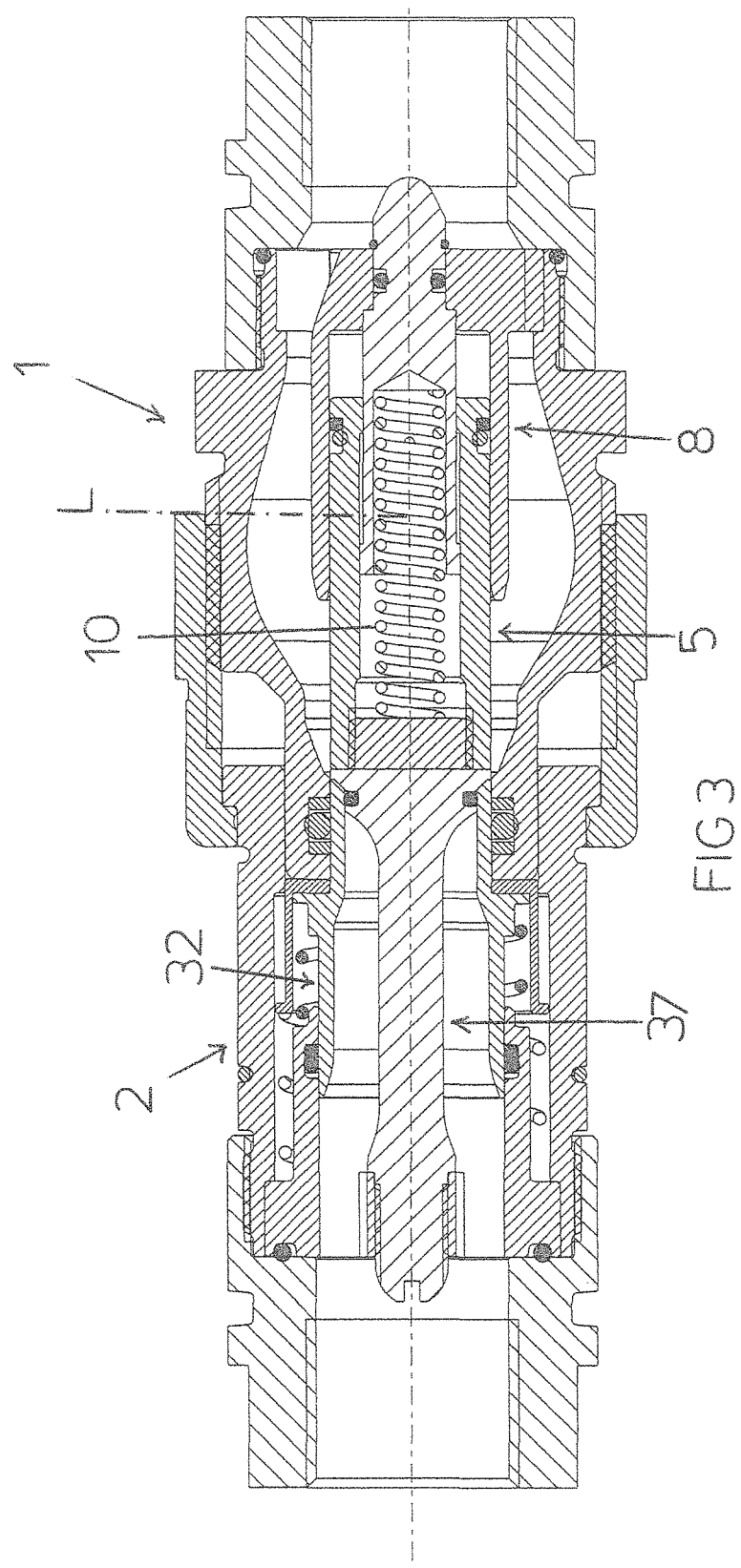
Figure 4:
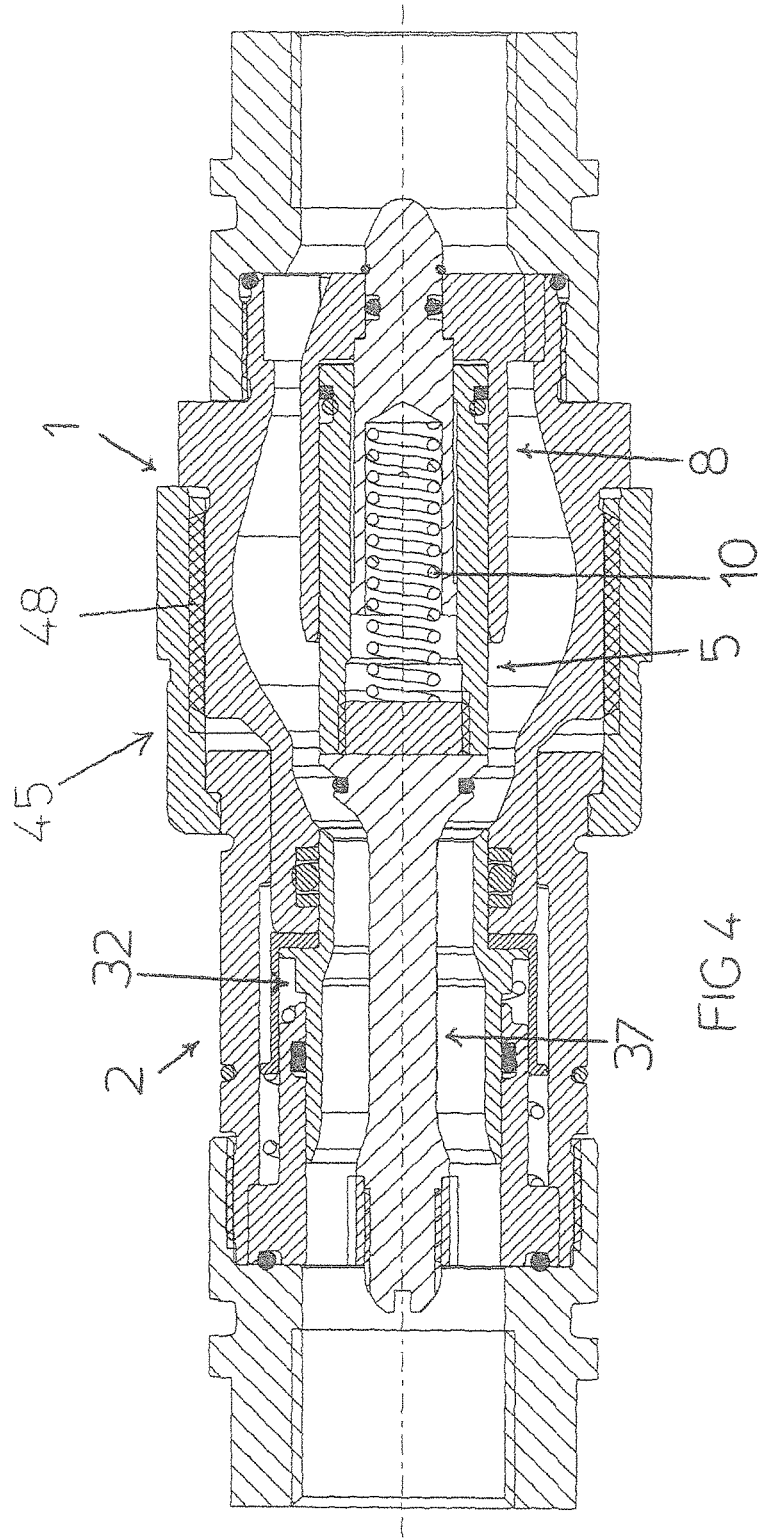

With reference to the figures cited hereinabove, a quick-fit hydraulic or hydrodynamic male coupling 1 and a quick-fit hydraulic or hydrodynamic female coupling 2 are shown.

The male coupling 1 comprises a valve body 3 extending along a longitudinal axis L and having a cavity 4 that extends axially for the entire length of the valve body, and a shutter stem 5 positioned in the cavity 6 coaxially to the axis L and that can be moved with respect to the valve body 3 along the axis L in contrast to and by action of at least one elastic element 6 between a position for opening and a position for closing an axial passage of fluid through the cavity 4.

In the position for closing the passage, the head end of the stem 5 and the head end of the valve body 3 are in hydraulically sealed contact along the perimeter by means of a seal 21.

In the position for opening the passage by effect of the relative movement between the stem 5 and the valve body 3, the head end of the stem 5 is detached and set back with respect to the head end of the valve body 3 itself.

The stem 5 is advantageously configured so as to be subjected by the fluid present in the cavity 4 to a resultant force having a substantially null component at least in an axial direction.

The stem 5 is preferably configured so as to be subjected by the fluid present in the cavity 4 to a resultant force having a substantially null component also in a radial direction.

The internal surface of the valve body 3 delimiting the cavity 4 has a generally convex configuration and the connectors between the various sections composing it have a wide radius of curvature so as to optimise flow head losses.

At least all of the part of the external lateral delimitation surface 7 of the stem 5 bathed by the pressurised fluid is advantageously cylinder-shaped.

The lateral delimitation surface 7 of the stem 5 bathed by the pressurised fluid can be of any other geometry that enables the fluid pressure to generate a resultant force having a substantially null component in an axial direction.

The lateral delimitation surface 7 of the stem 5 directly exposed to the pressure of the fluid may be for example prismatic, although the cylindrical configuration is clearly to be preferred owing to issues relating to fluid dynamics, the cylindrical configuration being the one that minimises head losses for the pressurised fluid flow.

The valve body 3 has a guide element 8 in which the stem 5 is slidingly engaged with the interposition of the elastic element 6.

The stem 5 has an internal axial cavity 9 in which the elastic element 6 is positioned and the elastic element 6 is specifically constituted by a helical spring 10.

The cavity 9 extends for the entire axial length of the stem 5 and it is closed by means of a cap 11 at the head end of the stem 5.

The cap 11 has a flat external surface arranged flush with the head end of the stem 5 and it can be applied precisely in the cavity 9 by means of a threaded coupling system.

The guide element 8 comprises a first bushing 13 oriented coaxially to the axis L, a second bushing 14 coaxial and external to the first bushing 13 with which it delimits a hollow space 15 in which the stem 5 is slidingly guided, and a plurality of tabs 16 for the centring of the guide element 8 in the valve body 3, said tabs 16 extending radially from the base 12 of the second bushing 14, enabling passage of the fluid flow.

The tabs 16 are made as a single piece with the second bushing 14, whereas the first bushing 13 is made as a distinct separate piece and has a base 23 that extends in the direction of the axis L and is hydraulically sealed by means of a seal 31 in a central through hole 24 in the base 12 of the second bushing 14.

A fastening ring 25 that locks the base 23 in the hole 24 is keyed onto the base 23 of the first bushing 13.

The tabs 16 are fastened between a groove 26 present on the internal surface of the base of the valve body 3 and an internal groove 27 on an adapter 28 screwed to an external thread 29 of the base of the valve body 3 and having a seal 30 ensuring it is hydraulically sealed with the valve body 3.

The external lateral surface of the first bushing 13 and the internal lateral surface of the stem 5 have respective projections 17 and 18 that are mutually engageable so as to prevent extraction of the base of the stem 5 from the hollow space 15.

The helical spring 10 is positioned in the variable-volume chamber 19 defined by the walls delimiting the cavity of the stem 5 and the cavity of the first bushing 13. More specifically, the helical spring 10 is arranged coaxially to the axis L with one end resting against the internal surface of the cap 11 and the other end resting on the bottom of the cavity of the first bushing 13.

The first bushing 13 has at least one calibrated through hole 22 for compensation of the volume of air present in the chamber 19 when the volume of the latter changes.

The hole 22 is intended to prevent the occurrence of internal residual pressures that can hinder disassembly of the constituent parts of the coupling.

A special seal 20 positioned in an annular groove along the perimeter of the external surface of the stem 5 ensures that the stem 5 and the second bushing 14 are hydraulically sealed.

The female coupling 2, which is of a known type, has a telescopic structure comprising a hollow valve body 32 made up of a fixed part 33, in which one part 34 is axially slidable in contrast to and by action of a spring 35, a hollow external body 36 for containing the valve body 32, a shutter 37 positioned coaxially in the valve body 32, and a sleeve 38 coaxially keyed onto the valve body 32 and axially slidable in contrast to and by action of a spring 39.

The shutter 37 is fixed at the base thereof to the fixed part 33 of the valve body 32 and it has a flat head 40.

In the position for closing the passage of fluid through the cavity of the valve body 32, the head 40 of the shutter 37 is perimetrically in contact with the head end of the valve body 32 and it is hydraulically sealed by means of a seal 41.

In the position for opening the passage of fluid through the cavity of the valve body 32, by effect of the relative movement between the shutter 37 and the valve body 32, the head 40 is detached and set forward with respect to the head end of the valve body 32.

The sleeve 38 is slidable in a hollow space 42 provided between the valve body 32 and the external containing body 36, in which the springs 35 and 39 are also positioned.

The spring 35 is interposed between the fixed part 33 of the valve body 32 and the movable part 34 del valve body 32, whereas the spring 39 is interposed between the fixed part 33 of the valve body 32 and the sleeve 38.

The movable part 34 of the valve body 32 has an external interference surface 43 interfering with the sleeve 38 for taking movement from the latter.

The external containing body 36 has an adapter 44 at the base and a ring nut 45 at the head for locking the connection of the female coupling 2 with the make coupling 1.

Figure 5:
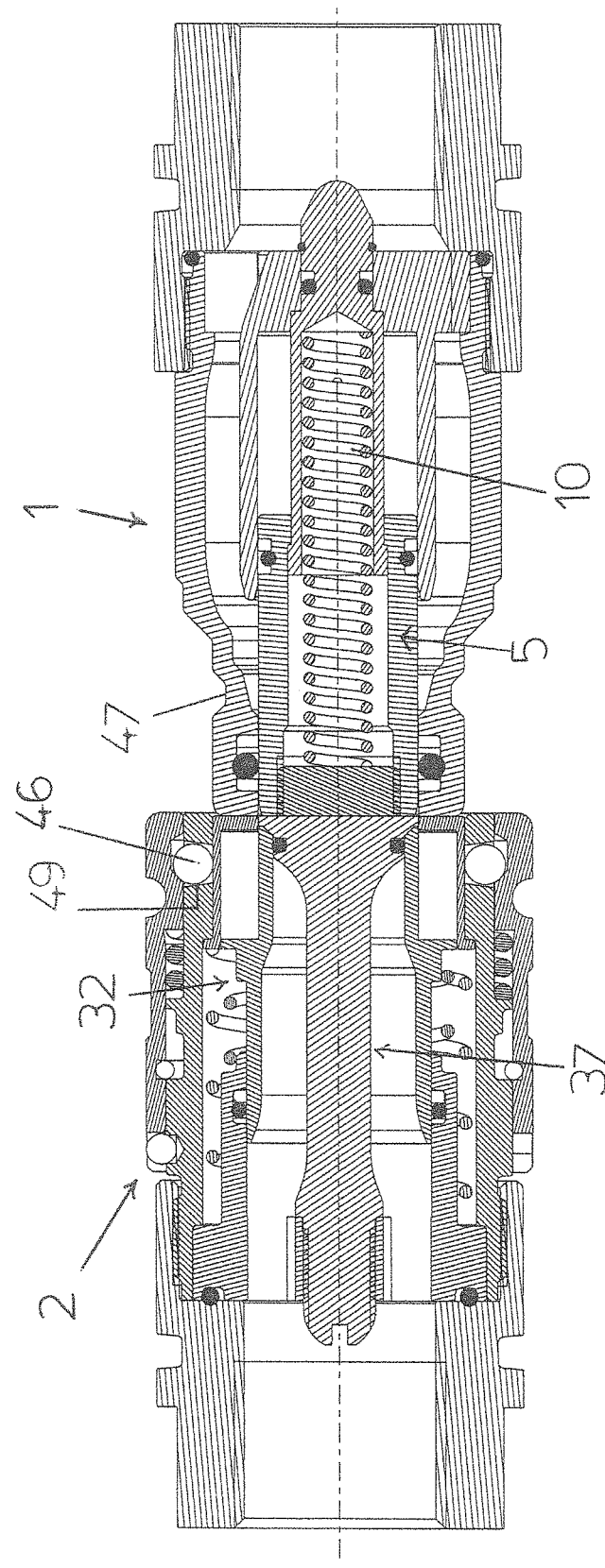

In the solution illustrated in FIGS. 1 to 4, the ring nut 45 can be screwed onto an external thread 48 of the valve body 3 of the male coupling 1, whereas in the solution illustrated in FIGS. 5 and 6, the ring nut 45 can be translated axially for locking determined by the insertion of a ball bearing 46 in an external circumferential race 47 of the valve body 3 of the male coupling 1.

With reference to the solution illustrated in FIGS. 1-4, locking elements can be provided for the ring nut 45 that easily indicate to the operator that the correct final position has been reached.

Referring once again to FIGS. 5 and 6, the containing body 36 has cone-shaped through seats 49 where the balls 46 are freely housed. The ring nut 45 instead internally has a circumferential perimetrical race 50 that can be aligned with the cone-shaped seats 49, and it can be activated in contrast to and by action of a helical spring 51 interposed between the ring nut 45 and the containing body 36. The engagement of the quick-fit male coupling 1 and the quick-fit female coupling 2 takes place in the following manner.

Prior to engagement, the quick-fit male coupling 1 is in a configuration in which the shutter 5 is kept against the valve body 3 by the spring 5, thereby closing the axial passage of fluid through the valve body 3.

Prior to engagement, the female coupling 2 is in a configuration in which the spring 35 keeps the movable part 34 of the valve body 32 extended against the head 40 of the shutter 27 in a position for closing the axial passage of fluid through the valve body 32, and in which the spring 39 keeps the sleeve 38 extended in a position flush with the head 40 of the shutter 27.

During the axial thrust by the operator for engagement, the head end of the valve body 3 of the male coupling 1 opposes the head end of the sleeve 38 of the female coupling 2 and pushes it, causing it to retract with respect to the valve body 32. At a certain point in the course of its retraction, the sleeve 38 intercepts the movable part 34 of the valve body 32, which, in turn, retracts with respect to the fixed shutter 37, thereby opening the axial passage for the fluid through the valve body 32.

Moreover, during the axial thrust by the operator for engagement, the head end of the shutter 5 of the male coupling 1 opposes the head end 40 of the fixed shutter 37 of the female coupling 2, by which it is pushed and thus retracts into the valve body 3, thereby opening the axial passage for the fluid through the valve body 3. It should be noted that the axial thrust exerted by the operator to engage the couplings is not obstructed in any manner whatsoever by the fluid pressure, as the shutter 5 has no surfaces exposed to the fluid that receive an axial thrust therefrom. The manual force exerted by the operator to engage the couplings is only that force required to surpass the elastic reaction of the springs 10, 35, 39 and as a result, the engagement can be carried out safely with the fluid under pressure.

As there is no need to release fluid pressure, there are no risks of fluid loss or exposure of the fluid to air.

The structure proposed for the quick-fit coupling according to the invention proves to be particularly advantageous also in that it maximises the flow rate of the fluid, minimising load losses owing to the configuration of the valve body and shutter stem surfaces exposed to the pressure of the fluid that make it possible to maintain a laminar flow along all sections through which the fluid passes.

The ring nut 45 is activated to lock the engagement of the male coupling 1 and the female coupling 2.

With reference to FIGS. 1-4, locking safety is already achieved when the ring nut 45 is secured onto the thread 48 (FIG. 1), given that this procedure prevents a sudden disconnection of the male coupling 1 and the female coupling 2, thus protecting the operator from any risk.

With reference to FIGS. 5 and 6, the race 50 is initially aligned with the seats 49 in which the balls 46 are locked by virtue of the restraint exerted by the sleeve 38. The balls 46 keep the ring nut 45 in position. The subsequent insertion of the male coupling 1 in the female coupling 2 causes the sleeve 38 to move until the race 47 is aligned with the seats 49. In this coupling configuration, the balls 46 project into the race 47 and free the ring nut 45, which, by effect of the relaxation of the spring 51, extends towards the male coupling 1. The extension of the ring nut 45 causes displacement of the race 50 from the seats 49, with the result that the balls 46 remain trapped inside the race 47, out of which they can no longer move, unless the ring nut 45 is retracted so as to realign the race 50 with the seats 49.

With reference to FIGS. 7 and 8, a multi-connection plate 100 appearing therein is provided with a plurality of couplings 1 in accordance with the teachings of the present invention, only one of which is shown in FIG. 7 for the sake of clarity.

The plate 100 comprises a stationary plate element 101 and a movable plate element 102, both having parallel principal faces opposite each other.

The movable plate element 102 has a plurality of male couplings 1, specifically, but not necessarily, six male couplings 1, each being arranged through a corresponding support hole 103 fashioned as a through hole through the thickness of the movable plate element 102.

The stationary plate element 101 has, for each male coupling 1, a corresponding coaxial female coupling 2 arranged through a corresponding support hole 104 fashioned as a through hole through the thickness of the stationary plate element 101.

The movable plate element 102 is supported by the stationary plate element 101 in a translatable manner, perpendicularly to its principal face, between a position of disengagement of the male couplings 1 and a position of engagement of the male couplings 1 from/in the corresponding female couplings 2.

The movement and the locking of the movable plate element 102 in the position of engagement of the male couplings 1 in the corresponding female couplings 2 are ensured by a lever 105 pivoted in 106 to the stationary plate element 101 and having a cam 107 for driving and locking a pin 108 that is solidly constrained to the movable plate element 102.

The version of the male coupling 1 illustrated in FIG. 8 obviously differs from those illustrated previously for the system for locking the engagement with the female coupling 2, which is now determined by the lever 105 and no longer by a ring nut. Moreover, owing to practical issues, in this case the stem 5 is constituted by two tubular, coaxial elements 5a, 5b that are fixed to each other. Lastly, in this case there is provided a safety system that prevents complete ejection of the stem 5 from the valve body 3. This safety system comprises an internal shoulder 109 of the valve body 3 suitable for intercepting an external perimetrical protrusion 110 of the stem 5, the external protrusion 110 normally being detached from the shoulder 109, if for any reason the stroke for extraction of the stem 5 extends beyond an established maximum limit. Of course, in this case as well, the configuration of the external surface of the stem 5 is such as to subject the stem 5 to a resultant force having a substantially null component at least in an axial direction. In other words, the extent of the external surface of the stem 5 exposed by the fluid to pressure in the direction of extraction of the stem 5 from the valve body 3 is substantially equal to the extent of the external surface of the stem 5 exposed by the fluid to pressure in the direction of retraction of the stem 5 into the valve body 3.

The quick-fit coupling thus conceived is susceptible to numerous modifications and variants, all of which falling within the scope of the inventive concept.

Moreover, all the details may be replaced with technically equivalent elements.

The materials used, as well as the dimensions, may in practice be of any type, according to requirements and the state of the art.

The invention claimed is:

1. A quick-fit coupling for pressurized fluid, comprising:
   a valve body extending along a longitudinal axis comprising:
   an axial cavity wherein a shutter stem is axially movable with respect to the valve body against the force of at least one elastic element between a position for opening and a position for closing an axial passage of fluid through said cavity, and a guide element wherein said stem is slidingly engaged with the valve body and with an interposition of said elastic element, wherein said stem be when subjected to the fluid present in said cavity is configured to receive a resultant force having a substantially null component at least in an axial direction, wherein an internal surface of the valve body delimiting the cavity has a convex configuration and is composed by various sections connected by connectors having a radius of curvature to optimize head losses, and wherein in said position for closing, before said quick-fit coupling is coupled, an extent of a surface of the stem exposed to fluid pressure in a direction of extraction of the stem from the valve body is equal to an extent of an external surface of the stem exposed to fluid pressure a in direction of retraction of the stem into the valve body.

2. The quick-fit coupling for pressurized fluid according to claim 1, wherein said stem is configured so as to be subjected by the fluid present in said cavity to a resultant force having a substantially null component in a radial direction.

3. The quick-fit coupling for pressurized fluid according to claim 1, wherein at least a lateral delimitation surface of the stem directly exposed to the pressure of the fluid is cylinder-shaped.

4. The quick-fit coupling for pressurized fluid according to claim 1, wherein said elastic element comprises a helical spring.

5. A multi-connection plate having two opposite plate elements mutually constrained in translation, one with respect to the other, a first plate element supporting a plurality of male couplings according to claim 1, a second plate element supporting a plurality of female couplings, each one being engageable by a corresponding male coupling, there being further provided a lever for the reciprocal movement and locking of the plate elements in a position of engagement of the male couplings in the corresponding female couplings.

6. The quick-fit coupling for pressurized fluid according to claim 1, wherein said stem has an internal axial cavity wherein said elastic element is positioned.

7. The quick-fit coupling for pressurized fluid according to claim 6, wherein said internal axial cavity is closed by a cap at a head end of said stem.

8. A combination of a quick-fit male coupling according to claim 1 and a quick-fit female coupling having a ring nut that is engageable with the valve body of the male coupling for locking the reciprocal connection.

9. The combination according to claim 8, wherein said ring nut can be screwed onto an external thread of said valve body of the male coupling.

10. The combination according to claim 8, wherein said ring nut is translatable for locking at least one ball bearing in an external circumferential race of the valve body of the male coupling.

11. The quick-fit coupling for pressurized fluid according to claim 1, wherein said guide element comprises:
a first bushing oriented coaxially to the said axis,
a second bushing coaxial and external to the said first bushing with which it delimits a hollow space wherein said stem is slidingly guided, and
a plurality of tabs entering said guide element in said valve body, said tabs extending radially from the base of said second bushing.

12. The quick-fit coupling for pressurized fluid according to claim 11, wherein said tabs are fastened between an internal groove on the valve body and an internal groove on an adapter screwed to an external thread of the valve body.

13. The quick-fit coupling for pressurized fluid according to claim 11, wherein said tabs are made as a single piece with said second bushing, and said first bushing is made as a distinct separate piece and has a base that extends in the direction of said axis and is hydraulically sealed in a central through hole in said base of said second bushing.

14. The quick-fit coupling for pressurized fluid according to claim 13, wherein said helical spring is positioned in the variable-volume chamber defined by walls delimiting the cavity of the stem and the cavity of the first bushing.

* * * * *